United States Patent Office 3,131,584
Patented May 5, 1964

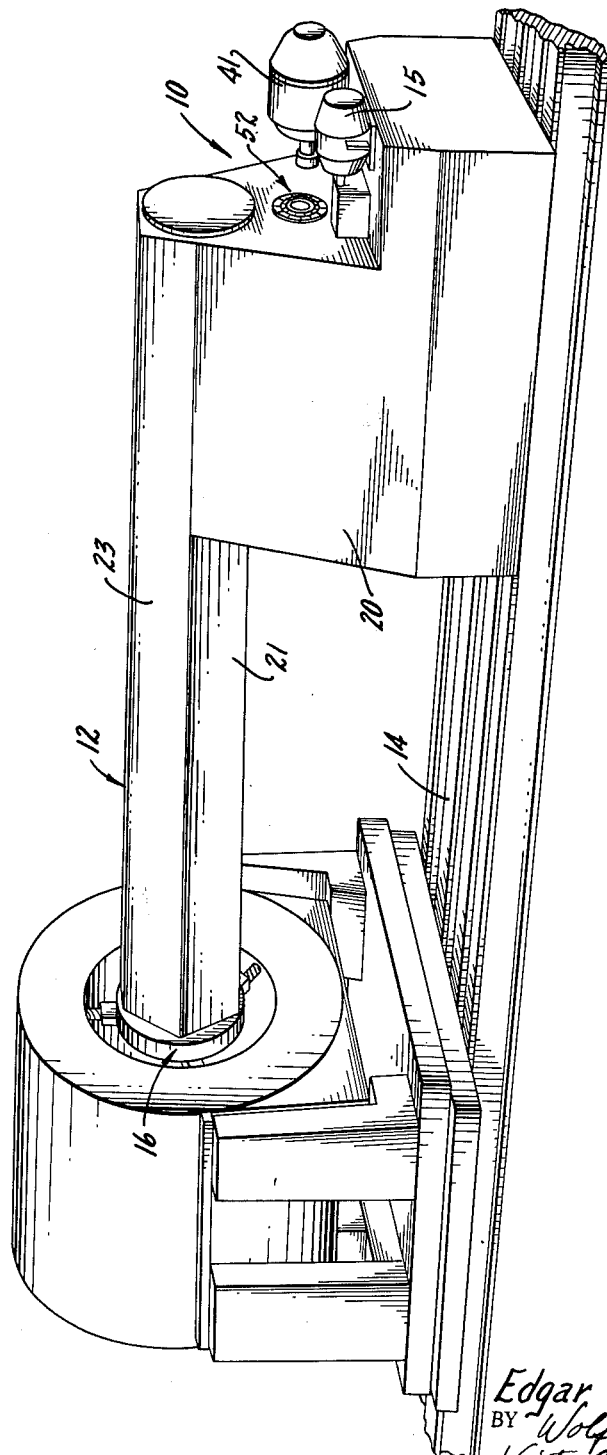

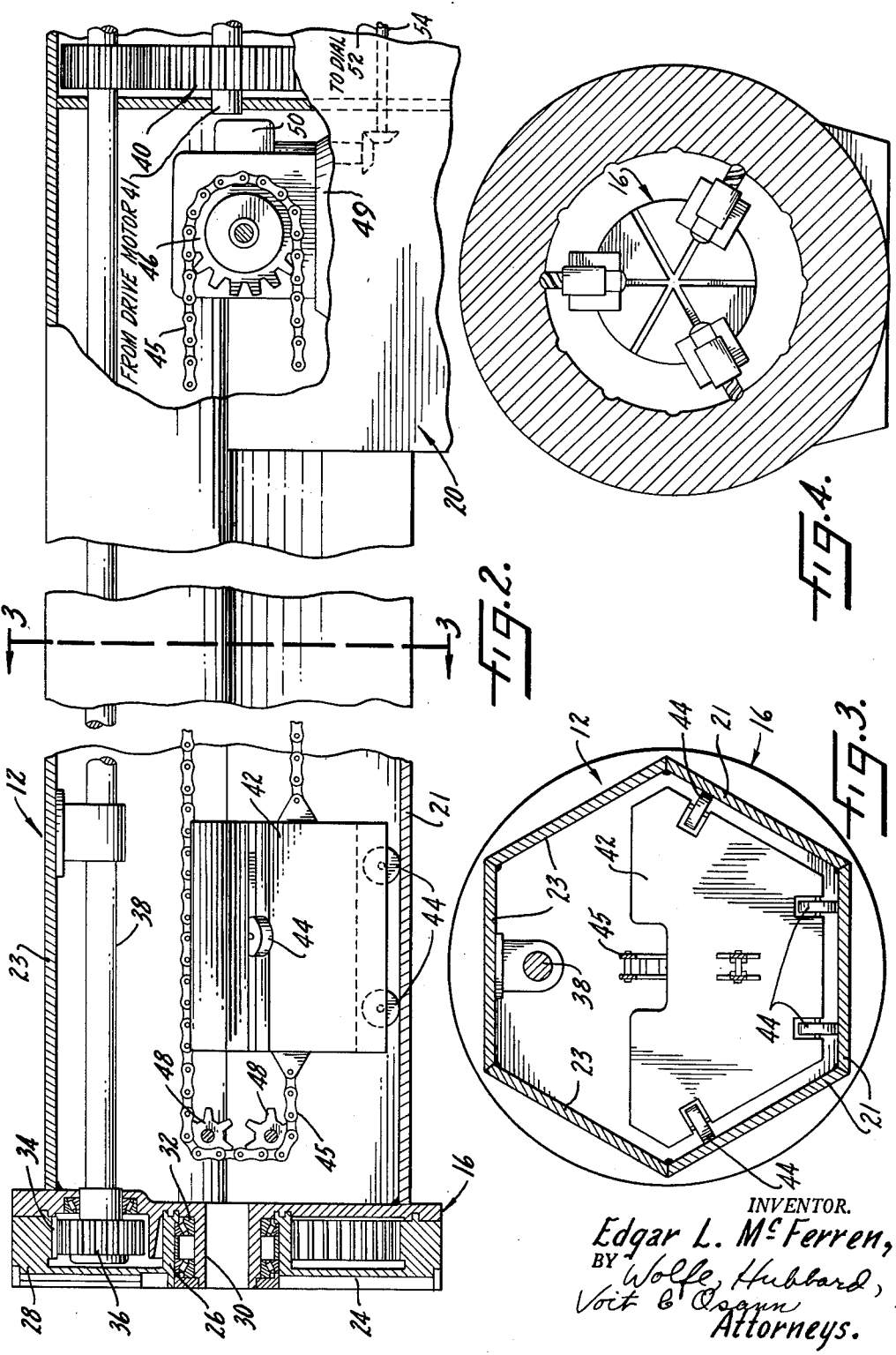

3,131,584
HORIZONTAL BORING MACHINE
Edgar L. McFerren, Fond du Lac, Wis., assignor to Giddings & Lewis Machine Tool Company, Fond du Lac, Wis., a corporation of Wisconsin
Filed May 1, 1961, Ser. No. 106,563
3 Claims. (Cl. 77—3)

This invention relates to machine tools and more particularly to a horizontal boring machine of expectionally large size and capacity, and with an extremely long reach for performing machining operations in large deep bores.

One object of the invention is to provide a horizontal boring machine which has a greater boring range and is capable of numerous drilling, milling, tapping and other machining operations. A related object is to provide a machine having greater versatility and capable of accurate machining of hard-to-reach surfaces, and unusual internal and external shoulders, grooves, and recesses in deep, large diameter bores.

Another object is to provide a horizontal boring machine having a long, fixed, externally unsupported ram bridging the span from a supporting column to extended holes or surfaces and presenting the cutting tool to the work. Another object is to provide a boring machine of the type set forth and having counterweight means for holding the ram in alignment without requiring additional support at some point along the ram thus insuring greater accuracy from the cutting tool.

Another object is to provide a machine tool of the type set forth and wherein the counterweight means is susceptible of control to adjust to tooling or attachments of different weight to check deflection of the ram.

Another object is to provide a machine tool of this type which without additional support for the ram or tooling carried thereby is effective to machine bores or surfaces comparatively far away from the supporting column, and wherein the cutting tool is held rigidly and against chattering to provide precision boring, drilling and milling operations.

Other and additional objects will appear from the following description taken in connection with the accompanying drawings, wherein:

FIGURE 1 is a perspective view of a horizontal boring machine embodying the features of the invention;

FIG. 2 is a longitudinal fragmentary vertical section of the machine tool shown in FIG. 1;

FIG. 3 is a transverse vertical section taken substantially in the plane of lines 3—3 of FIG. 2; and FIG. 4 is an end view of the ram.

While the invention is susceptible of various modifications and alternative constructions, a preferred embodiment is shown in the drawings and will be described below in considerable detail. It will be understood that there is no intention to limit the invention to the specific form disclosed, but on the contrary, the intention is to cover all modifications, alternative constructions, and equivalents falling within the spirit and scope of the appended claims.

Upon more specific reference to the drawings, it will be perceived that the invention is exemplified as a machine tool in the form of a large, high-speed, boring machine comprising an upright column 10 having a horizontal ram 12 reaching out from said column and carrying tooling such as cutters for boring or milling on the end of the ram. As shown in FIG. 1 the column is carried for movement along a runway 14. The ram extends parallel to the ways of the runway which is also used to carry a table on which a workpiece is mounted. While the massive workpiece shown in FIG. 1 is mounted on a table on the runway 14 and adjacent the machine tool column it will be understood that depending on the workpiece and the machining operations to be performed it may be carried on a bed or plate fixed to the floor. The horizontal boring machine is reciprocable along the runway 14 as by a means of a conventional drive operated by the motor 15 supported on the column 10. In this manner tooling carried by a face plate 16 on the outboard end of the ram 12 may be positioned for machining operations to be carried out within the workpiece. With such an arrangement of movable column and movable workpiece machining operations may be carried out while feeding the tooling into the work or the work toward the machine tool.

The machine tool which is illustrated in the drawings is capable of precision boring of large diameter deep bores and is further capable of carrying out precision boring, milling and other machining operations on surfaces comparatively far away from the column within such deep bores. The ram of this machine tool serves the function of transmitting the power from the drive motors in the column to the cutting tool, at the same time holding the cutting tool securely while presenting it to the work as the machining operation progresses. In its exemplary form the machine including column 10 and ram 12 comprises an unusually large machine weighing up to one hundred and fifty tons. It provides a machine tool capable of supplying power to operate special tools and attachments for performing operations involved with machining massive workpieces such as turbine housing or stator housing castings of the type shown in FIG. 1.

The column 10 must be of very heavy and sturdy construction since it must bear the full weight of the long ram 12 which is otherwise externally unsupported and tooling carried on the end of the ram. In addition it must also provide ample space to house the various gear drive mechanisms for the face plate 16 and tooling. To this end the upright column 10 is constructed with a wide base for stability and vertical sides 20 forming a hollow housing within which the motor units and gearing are located. Referring now to FIG. 2, the ram as depicted in this figure and in FIG. 1 is tubular for greatest rigidity with the least weight. The ram is constructed of elongated plates 21 welded to each other along seams at their edges so as to form a rigid hexagonal tubular structure with the upper plates 23 extended to form the crown of the column 10. These latter ram plates 23 are fixed to the sides 20 of the upright column and braced so as to afford a ram structure capable of carrying heavy tooling on the face plate of the ram. As shown, the ram is hexagonal in cross section although this is exemplary and may be varied according to mechanical and manufacturing considerations. Illustratively, the length of the ram extending past the column 10 is twenty-five feet. A typical workpiece like that shown in the drawings might have a stator area at one end approximately twenty-five feet long. Without an outboard support for the ram, which would be of questionable effectiveness because of the long extension required, or intermediate means of support for the ram, this machine tool is capable of precision boring or precision machining the full length of the large diameter stator bore using tooling attachments carried in the face plate 16.

Still referring to FIG. 2, the details of the face plate 16 and the drive therefor will be described. The face plate 16 is mounted on the end of the ram 12 and is guided for rotation about an axis parallel to the axis of the ram. The face plate 16 is preferably in the form of a casting including a flat circular disc 24 with integrally formed ribs on its rear face to provide strength and rigidity. Integral with the disc is a central rearwardly projecting hub 26 and a rearwardly projecting flange or rim 28 which extends around the peripheral edge of the disc. The front flat face of the disc is shown having suitable means for attachment of tooling, fixtures or the like to the plate, herein shown as including T-slots which extend radially of the face plate for slidably receiving tooling mounting slides. The face plate hub 26 has a central bore for the reception of the stub spindle 30 and is supported thereon by bearings 32. For rotating the face plate for carrying out a machining operation, the teeth of a ring gear 34 rigid with the face plate engage the teeth of a pinion 36 keyed or splined to a drive shaft 38. The drive shaft 38 extends through the ram and is connected via suitable transmission gearing 40 to a motor 41 supported on the upright column. Such transmission gearing 40 and drive shaft 38 supplies power to the face plate mechanism.

It will be apparent from the foregoing that the mounting provided for the face plate 16 affords maximum rigidity and locates the face plate so that it may be driven directly through the transmission elements and the drive shaft supported in the hollow ram. In addition to boring and like cutting tools the face plate 16 also provides means for carrying other types of tooling attachments. It is contemplated widely different forms of tooling and attachments will be provided for the machine tool thereby providing means for carrying out machining operations such as boring, reaming or tapping or for carrying out other operations such as milling or slotting. One example of such tooling is a single cutter. Another is multiple cutters radially positioned on the face plate equidistant from its axis. This setup is best applied to long cut in production roughing or semi-finish boring. Other types of multiple tooling may be used such as reamers or taps mounted on the face plate. Multiple tooling setups may include combinations of different types of tooling to carry out different types of machining in the same work setup. Furthermore, special tooling may be used, an example of which is shown in FIG. 4. Such exemplary tooling includes individually powered milling heads mounted for radial movement in radial T-slots in the face plate. By rotating the face plate 16 at a very slow rate while feeding such tooling along a bore slots will be milled in the bore surface, as shown in FIG. 4. Control of tooling attachments or face plate operation in this and in equivalent manner will be by conventional control instrumentalities.

It is recognized that with conventional horizontal boring machines it is not possible to perform all boring operations with tools directly bolted to the headstock or overhung from the spindle. An outboard support or bearing must be provided for long boring bars or large and heavy cutting tools. In the machine tool shown in the drawings and constructed according to this invention the unsupported length of the ram 12 between the upright column 10 and face plate 16 is such that heavy tooling will produce substantial deflections of the end of the ram. With different tooling supported on the face plate 16 ranging from a simple setup including a single light weight cutting tool to relatively complex setups involving, for example, massive and heavy independently powered adjustable milling heads for milling or slotting, a serious alignment problem is presented when changing tooling since any vertical deviations in the face plate axis between succeeding operations in the same bore with different tooling will affect machining precision. Efforts in the direction of increasing rigidity by further strengthening the ram to prevent such deflections produce progressively greater problems of weight and cost.

According to the present invention, therefore, instead of trying to prevent such deflections by increasing ram rigidity, it is now proposed to provide counterweight means to compensate for changes in the weight of tooling carried by the ram tending to produce deflections of the ram. As shown in FIG. 2, such means is shown as a counterweight member 42 slidable horizontally within the ram and guided by rollers 44 engaging the plates forming the bottom wall and the lower slanting sidewalls of the ram housing. Rollers 44 rotatably carried in clearance slots in the underside of the counterweight provide an anti-friction means for facilitating movement of the counterweight.

In keeping with the invention, the counterweight member 42 is positionable along the ram between limit positions adjacent the face plate 16 and the column 10. Power means for this purpose includes a roller chain 45 connected to the member and trained about a drive sprocket 46 and an idler sprocket means 48. For simplicity of this disclosure, the drive sprocket 46 is driven by a gear reduction unit 49 which is powered by a motor 50. The motor 50 which may be of the reversing type is operated by well known control instrumentalities so that the counterweight 50 may be positioned as required.

It will be understood that the horizontal position for the counterweight is determined according to the weight of the tooling supported on the face plate 16. Following usual alignment procedures, for example, the ram will be aligned initially with no tooling on the face plate, by moving the counterweight member from a position adjacent the upright support, the inner limit position, to the extreme outer limit or outboard position adjacent the face plate. With the counterweight at its outboard position the end of the ram will be caused to deflect downwardly. The amount of the deflection will depend upon the rigidity of the ram and the weight of the counterweight member. The position of the axis of the face plate with the counterweight member at its extreme position is the initial aligned position of the face plate and the ram. When a tooling attachment or set of tooling is added to the face plate, the additional weight will tend to further deflect the end of the ram downwardly. To compensate for this additional tooling weight, the counterweight member will be shifted horizontally inward from the extreme limit position to a point where, by measurement, it is determined that the face plate axis has maintained its aligned position. By following this procedure with different sets of tooling, the counterweight member horizontal position for each tooling set or attachment may be determined empirically.

It will be further understood that this procedure may be varied to suit machining operations and special tooling for any particular job. For example, the initially aligned position of the face plate may be found with the lightest set of tooling for machining operations on a particular workpiece, and the subsequent alignment procedure carried out relative to such position. If a tooling set or attachment is used in all machining operations on a workpiece the initial alignment position may be found with such tooling mounted on the ram. In general, regardless of whether the machine tool is initially aligned with or without tooling mounted for operation on the face plate, the movable counterweight and associated elements provide means for compensating the effect of adding to or subtracting from the weight of tooling on the ram. To this end the counterweight is shiftable horizontally to different positions according to the weight of tooling supported by the ram so that the deflection caused by the combined weight of the counterweight means and tooling are maintained substantially constant with tooling of different weight.

Since the counterweight member is hidden from view within the ram, means are included for visually indicating the counterweight position, herein shown, as a dial 52 on one wall of the column operated to record the counterweight feed. Such dial is connected by any suitable mechanism including a shaft 54 (FIG. 2) to the counterweight member drive shaft 49. Such dial is driven to record the movement of the counterweight member from a reference position, which might be the outermost position in the ram, and provides means for adjusting the position of the counterweight according to the tooling on the ram to check ram deflection.

I claim:

1. In a machine tool having an upright support, means for supporting a workpiece, a horizontal ram reaching out from said upright support toward said workpiece support means, means on said ram spaced from said upright support for carrying tooling the weight of which tends to cause vertical deflections of said tooling carrying means on said ram, means for moving said ram support and said workpiece support means relatively for carrying out cutting operations with said tooling on said workpiece, and counterweight means having a center of gravity shiftable horizontally along said ram to different positions located between said upright support and tooling carrying means according to the weight of tooling on the ram so that said deflections caused by the combined weight of said counterweight means and tooling are maintained substantially constant with tooling of different weight, said counterweight means being adapted to be fixed in such different positions for cutting operations with tooling supported on said ram.

2. In a machine tool having an upright support, a hollow ram reaching out from said support and having a free end, a tooling mounting face plate carried on said free end of said ram, drive means for said face plate extending through said hollow ram from said upright support, a counterweight member mounted within said ram for longitudinal movement, and means for moving said counterweight member to different horizontal positions along said ram according to the weight of tooling on said ram face plate so that deflections of said face plate caused by the combined weight of said counterweight member and tooling are maintained substantially constant with tooling of different weight said counterweight member being adapted to be fixed in such different positions for cutting operations with tooling supported on said ram.

3. In a machine tool having an upright support, a horizontal ram reaching out from said support to an unsupported free end and having a hollow housing, a tooling mounting face plate carried on said free end of said ram housing, drive means for said face plate extending through said hollow ram housing from said upright support, a counterweight member, anti-friction means for supporting said counterweight member for horizontal movement along the inside wall of said ram housing, and means for moving said counterweight member to different horizontal positions along said ram according to the weight of tooling on said ram face plate so that deflections of said ram end and face plate carried thereon caused by the combined weight of said counterweight member and tooling are maintained substantially constant with tooling of different weight said counterweight member being adapted to be fixed in such different positions for cutting operations with tooling supported on said ram.

References Cited in the file of this patent
UNITED STATES PATENTS

| | | |
|---|---|---|
| 1,496,169 | Pyle | June 3, 1924 |
| 2,221,638 | Indge | Nov. 12, 1940 |
| 2,432,943 | Shaw | Dec. 16, 1947 |

FOREIGN PATENTS

| | | |
|---|---|---|
| 234,069 | Germany | May 1, 1911 |
| 234,273 | Germany | May 5, 1911 |